L. A. DREY.
DROP FEEDING DEVICE FOR GLASS MACHINES.
APPLICATION FILED FEB. 5, 1916.
1,215,507.
Patented Feb. 13, 1917.
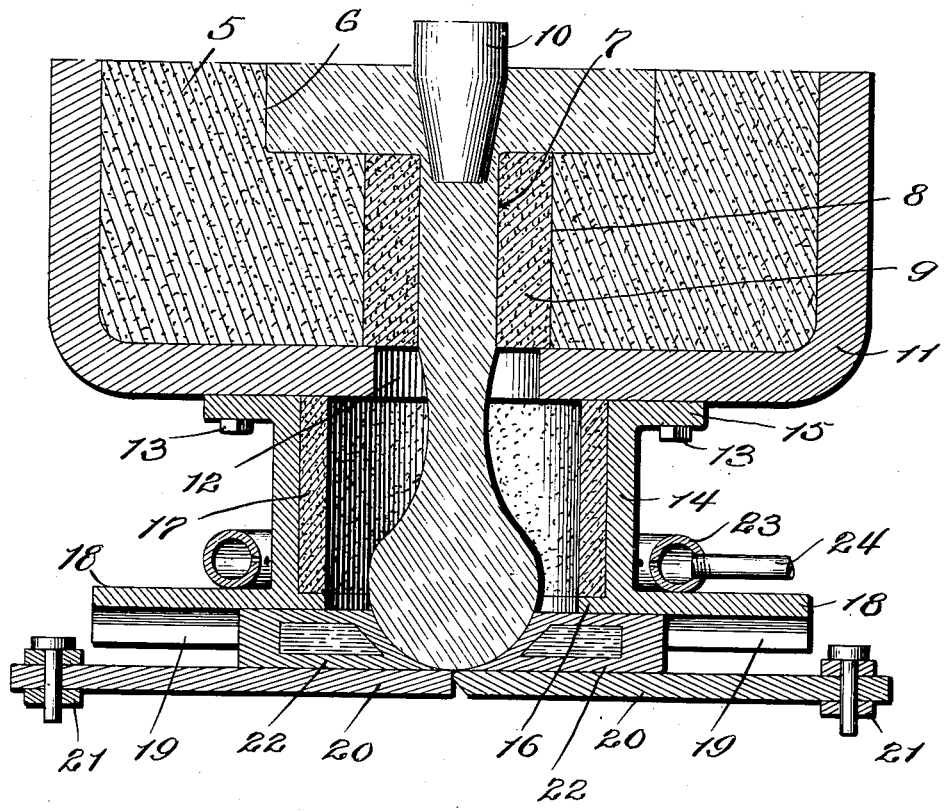
INVENTOR
LEO A. DREY
by Higdon & Longan ATTYS.

UNITED STATES PATENT OFFICE.

LEO ALBERT DREY, OF ST. LOUIS, MISSOURI, ASSIGNOR TO DREY AUTOMATIC GLASS MACHINE COMPANY, OF ST. LOUIS, MISSOURI, A CORPORATION OF MISSOURI.

DROP-FEEDING DEVICE FOR GLASS-MACHINES.

1,215,507.      Specification of Letters Patent.      Patented Feb. 13, 1917.

Application filed February 5, 1916. Serial No. 76,430.

*To all whom it may concern:*

Be it known that I, LEO A. DREY, a citizen of the United States, and resident of St. Louis, Missouri, have invented certain new and useful Improvements in Drop-Feeding Devices for Glass-Machines, of which the following is a specification containing a full, clear, and exact description, reference being had to the accompanying drawings, forming a part hereof.

My invention relates to improvements in drop feeding devices for glass machines, and is especially directed to the type of devices as shown and described in U. S. Letters-Patent No. 1,146,694, granted to me on the 13th day of July, 1915.

The form of device as shown in the said patent comprises a chamber which was built in to a furnace projection or boot in which batches of glass were gathered and during gathering subjected to heat radiating from the furnace as well as the gathered batch of glass and periodically dropped, into molds which were, successively to be brought beneath the chamber.

The object of my present invention is to construct a chamber which may be readily applied to an ordinary furnace projection or boot without alterations, and further to provide a means whereby heat from a source extraneous to the glass or furnace, may be utilized for producing any desired temperature in the chamber in which the batches of glass are gathered.

In the accompanying drawing, which forms a part of this specification, I illustrate one form of the device constructed according to my invention, and for convenience will refer to the various parts of the structure by reference characters.

The numeral 5 designates the body of a boot or furnace projection which is as common made of ceramic material and provided with a trough 6 through which the molten glass flows outwardly from the furnace proper to the discharge orifice 7, intersecting the trough 6 and located adjacent its outermost end.

Formed vertically through the body of the boot adjacent its outer end, and intersecting the trough 6 is an opening 8 arranged to receive a ceramic bushing 9 in which is formed the discharge opening 7 of the furnace projection or boot.

For the purpose of controlling the volume of glass discharging from the furnace, I provide a plug 10 constructed of ceramic material which is raised and lowered with relation to the discharge orifice 7 by any means common to the art and not shown here.

The body of the boot 5 is as shown supported by a metallic harness 11 having an opening 12 therethrough in registration with the opening 8 in the boot which opening 12 is of a lesser diameter than the opening 8 in the boot in order to provide a projecting shelf upon which to support the bushing 9.

While this opening 12 is shown to be of a lesser diameter than the opening 8 in the boot, it is essential that it be of a greater diameter than the discharge orifice 7 in order to prevent glass flowing from the discharge orifice contacting with the harness.

To the lowermost face of the harness 11 I secure by the cap screws 13 the chamber 14 which is by preference of cylindrical formation having at its top an out-turned flange 15 through which the cap screws 13 are extended for securing to the harness and at its bottom an in-turned flange 16 which constitutes a support for a ceramic lining 17 for the chamber. This chamber is further provided at its bottom with the outstanding flanges 18 which carry the parallel guides 19 for the support of the glass supporting and severing knives 20.

At the outer end of each of the knives 20 I connect the knife operating levers 21 which serve to draw the said knives outwardly to permit the gathered batch of glass to be dropped from the chamber into a mold provided therebeneath, as well as to move the knives toward each other so that their innermost ends will co-act to sever the batch of glass from the glass discharging from the orifice 7.

On the upper surface of each of the knife elements 20 I mount a water jacketed cup 22 which conjointly form a depression in which to catch the attenuated stream end and gather and build up a batch of glass of greater diameter than the glass as it discharges from the orifice, but of lesser diameter than the chamber in which it is gathered.

In order to subject the gatherings of glass to heat during the times of gathering, in order to preserve them in proper condition for subsequent forming or shaping operations, I provide a burner 23 arranged to direct a heating medium against the chamber, and which is connected by means of the pipe 24 with a source of heating medium not shown.

By preference, the burner is of hollow ring formation having in its wall next adjacent the chamber 14 perforations as is common with gas burners to direct flames against the heating chamber and by preference these flames are directed against the wall of the chamber around the point opposite the greatest diameter of the gathered batch of glass.

The chamber in the device of my former patent previously referred to, served as a means for enveloping the gathered batches of glass in a quiescent body of heat derived solely from the furnace and the gathering of glass by radiation, and hence the temperature of such enveloping body of heat was limited.

By employing the burner as shown in the present structure I am enabled to control the temperature of the heating medium which envelops the batch of glass as it is gathered in the chamber to any desired temperature, and further, by utilizing this independent source of heat the chamber may be maintained in a heated condition during the time the gob collecting and severing means is open, thus preventing the passage of glass from the glass receptacle into a medium far below the temperature of that from which the glass is gathered.

The law of operation of the present structure is substantially the same as that governing the operation of the device of my former patent, and for this reason it is deemed not necessary to enter into its full detail here.

Having thus described my invention, what I claim as new therein and desire to secure by Letters-Patent of the United States, therefor is:

1. The combination with a glass furnace having an orifice through which glass is discharged by the action of gravity, a removable heating chamber of greater cross sectional dimensions than said orifice whereby a stream of glass flowing from the orifice will flow through said heating chamber without engaging its walls, of movable means beneath the heating chamber comprising glass severing means whereby to support or hold the accumulated glass within the chamber and removed from the walls thereof, and means for applying heat to the outer surface of said chamber whereby the temperature of the batch of glass accumulated within said chamber may be regulated.

2. In combination with a furnace having a discharge orifice, a chamber, means for securing said chamber to the furnace surrounding its discharge orifice, a bottom in said chamber comprising partible elements, means carried by said chamber for slidably supporting said partible bottom elements, and means for applying external heat to said chamber comprising an element surrounding said chamber whereby batches of glass may be gathered in said chamber with portions thereof in free suspension and such portions enveloped in heat derived from a source independent of the furnace from which the gatherings are discharged and the glass itself.

3. The combination with a molten glass receptacle having a discharge orifice, of an auxiliary chamber surrounding said orifice, whose upper wall is formed by said receptacle, a gob collecting and severing means forming the bottom of said chamber, said chamber maintaining when the gob collecting and severing means is closed, a heated gaseous envelop around the accumulated glass, and means for applying heat to the exterior surface of said chamber whereby the temperature of the heated envelop and consequently the gob of glass itself, may be regulated and the temperature of the chamber when the gob collecting and severing means is open may be regulated.

In testimony whereof, I have signed my name to this specification, in presence of two subscribing witnesses.

LEO ALBERT DREY.

Witnesses:
A. C. KIBURTZ,
R. G. ORWIG.